May 7, 1929.  H. SMITH  1,711,753
MOWING ATTACHMENT FOR TRACTORS
Filed Nov. 27, 1922  2 Sheets-Sheet 1
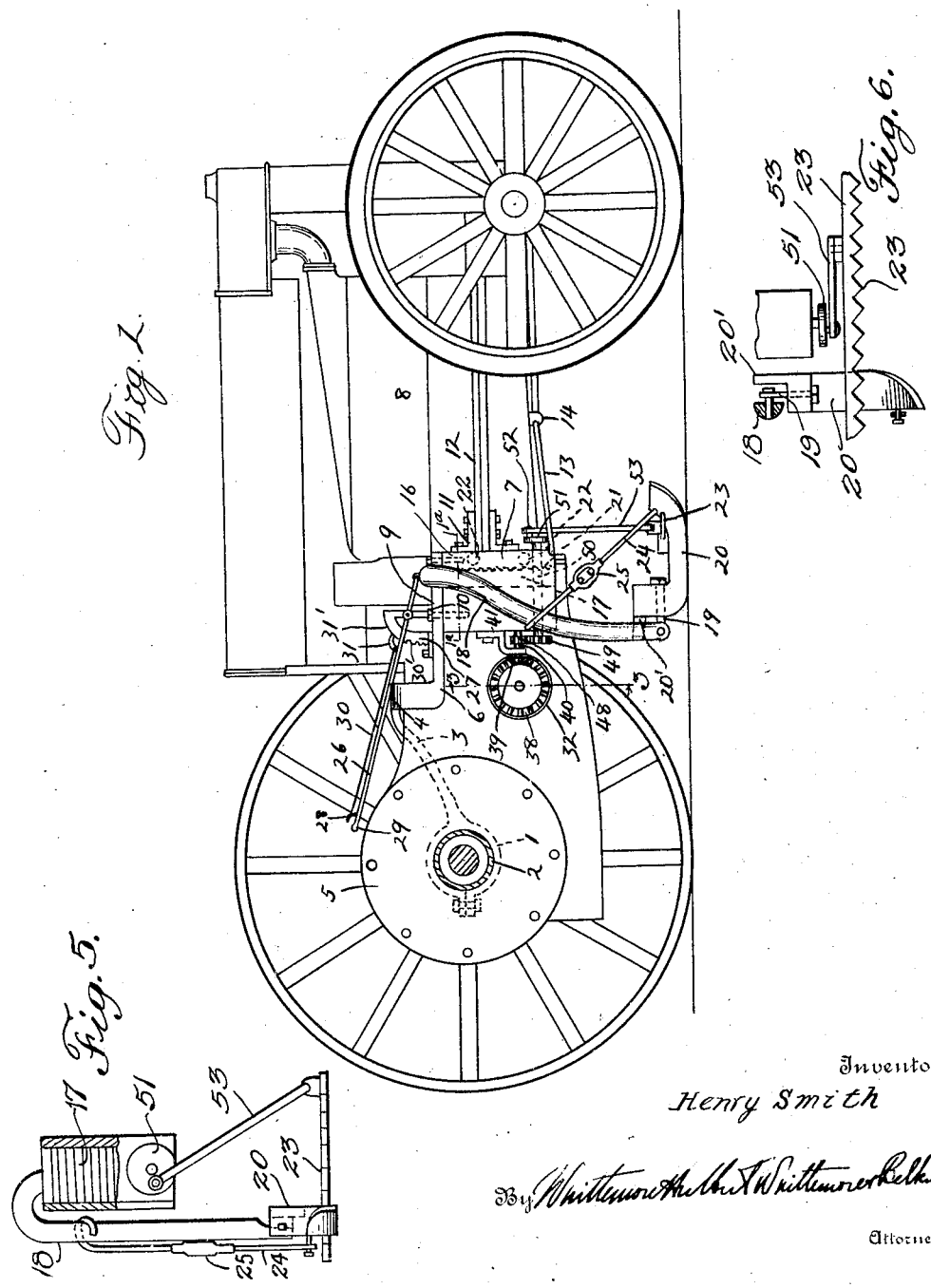
Inventor
Henry Smith

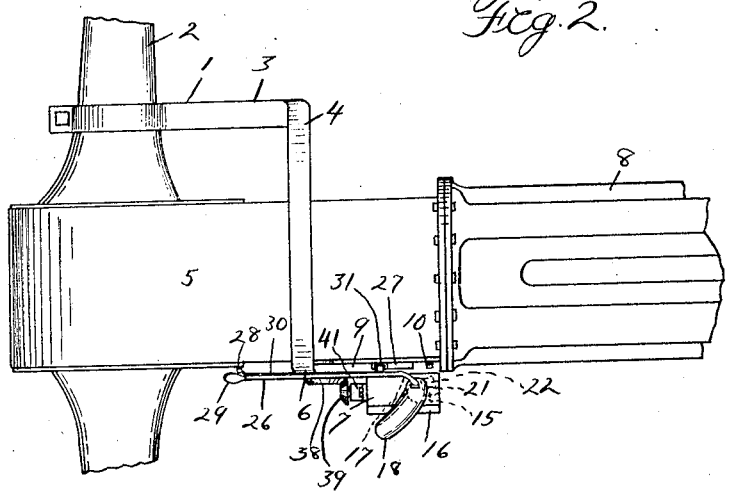
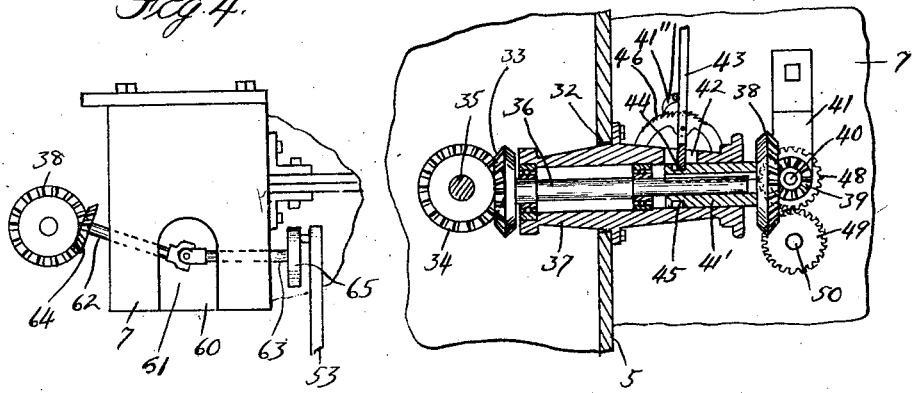
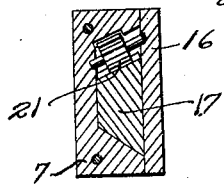

Patented May 7, 1929.

1,711,753

UNITED STATES PATENT OFFICE.

HENRY SMITH, OF PORT HURON, MICHIGAN.

MOWING ATTACHMENT FOR TRACTORS.

Application filed November 27, 1922. Serial No. 603,680.

This invention relates to tractors and particularly to mowing attachments therefor.

An object of the invention is to provide a simple and efficient attachment which may be readily applied to or removed from a tractor without affecting the working parts thereof.

Another object is to provide reliable and practical means for operating the cutter-bar of the mowing attachment from the main drive means of the tractor.

Another object is to provide an attachment in which the ground engaging shoe supporting the cutter-bar may be raised sufficiently above the level of the ground to render the cutter-bar inoperative.

Another object is the provision of means for raising and lowering the forward end of the ground engaging shoe to vary the distance between the cutter-bar and the ground.

With the above and other objects in view, the invention consists in certain novel features of construction, combination, and arrangement of parts as will be more fully described and particularly pointed out in the appended claims:

In the accompanying drawings:

Figure 1 is a side elevation of a tractor showing the attachment applied thereto and showing parts in section;

Fig. 1ª is a cross section on line 1ª—1ª of Fig. 1 showing the channeled block which carries most of the attachment parts and showing a member in the channel of said block for raising and lowering the cutter bar.

Figure 2 is a fragmentary top plan view of the construction shown in Figure 1;

Figure 3 is a detail sectional view of the "take-off" connection taken on line 3—3 of Fig. 1;

Figure 4 is a detail view of a slightly modified form of construction.

Figure 5 is a front elevation of the supporting element; Figure 6 is a plan view of the cutting mechanism.

Referring now to the drawings in which like characters of reference designate corresponding parts throughout the several views, the numeral 1 designates a bracket detachably secured to the rear axle housing 2 of a tractor. The bracket is preferably secured to the housing upon the left side of the tractor and is provided with an upwardly inclined arm 3 which is bent at right angles as shown at 4 and extends over the transmission housing 5 to the right side of the tractor where the said arm is again bent at right angles as shown at 6 and extends forwardly along the transmission housing.

A block 7, of any suitable material, is fashioned upon one side to conform to the shape of the adjacent sides of the engine casing 8 and transmission housing 5 and is rigidly secured at the upper end thereof to the forwardly extending portion 9 of the arm by means of the bolts 10. If desired, brackets 11 may be secured to one side of the block and to the horizontal flanges 12 of the engine casing. Brace rods 13 may also be secured to the blocks at the lower end thereof and to the usual radius rod couplings 14.

A vertical groove 15, preferably having flared sides, is formed in the block 7 and cooperates with a retaining plate 16 secured to the block to form a suitable guideway for a bar 17. This bar is slidably mounted in the guideway and is provided with an inclined downwardly extending portion or arm 18 which is pivotally connected at its lower end to a relatively short horizontally extending rod 19 supporting the ground engaging shoe 20 of the mower. To prevent the shoe from turning on the rod 19 and causing the outer end of the cutter-bar to remain on the ground when the shoe 20 and bar 17 are raised there is a lug 20', extending rearwardly from the shoe and engaging the downwardly extending portion 18 of the bar.

To facilitate the movement of the bar 17 in the guideway, the bar is preferably provided with a rack 21 which meshes with a pair of spaced pinions 22 rotatably mounted in the block 7. The shoe 20 is pivotally mounted on the rod 19 and supports the reciprocatory cutter-bar 23. The forward end of the shoe is connected to the inclined portion 18 of the bar by means of a brace 24 having a turn-buckle connection 25 so that upon operating the turn-buckle, the distance between the cutter bar and the ground may be varied.

For raising and retaining the shoe a sufficient distance above the ground, a relatively long lever 26 is pivotally connected to the bar 17 at the upper end thereof and is fulcrumed upon a segment 27 rigidly secured to the arm 9. A grip 28 is pivotally mounted upon the handle 29 of the lever and is connected to a rod 30 extending parallel to the lever. A spring pressed pawl 31 is secured to the forward end of the rod and is adapted to engage the teeth 30′ upon the lower portion of the segment to retain the lever in any position to which it may be adjusted. The upper portion of the segment is preferably smooth as shown at 31′ to permit of the free movement of the lever 26 and bar 17 while the shoe is engaging the ground.

The tractor is provided with a drive "take-off" at one side thereof to which the drive mechanism of the attachment may be operably connected. In detail, an opening 32 is formed in one side of the transmission housing to receive a beveled gear 33 which may be placed in mesh with a beveled gear 34 rigidly secured to the transmission shaft 35 of the tractor engine. The gear 33 is preferably rigidly secured to a stub shaft 36 which is journaled in suitable bearings in a housing 37 detachably secured to the transmission housing.

A beveled gear 38 is splined upon the stub shaft 36 at the outer end thereof and is adapted to mesh with a beveled gear 39 secured to a stub shaft 40 which is journaled in suitable bearings in a bracket 41 secured to the block 7. The housing 37 is provided with an elongated opening 42 to receive a clutch lever 43 which is provided at its inner end with a yoke 44 for engagement with an annular groove 45 in the hub 41′ of the gear 38. The lever 43 is pivotally mounted upon the housing 37 and is retained in any desired position by means of the dog 41″ and toothed segment 46. A suitable plate (not shown) may be secured to the transmission housing to cover the opening 32 when the attachment is removed from the tractor. A pinion 48 is secured to the shaft 40 and meshes with a gear 49 secured to a relatively long shaft 50 which is journaled in suitable bearings in the block. A disk 51 is secured to the forward end of the shaft 50 and is provided near its periphery with a pin 52. An inclined connecting rod 53 is pivotally mounted on the pin and is pivotally secured to the cutter bar 23 at one end thereof.

When it is desired to attach the mower to the tractor, the cover plate (not shown) normally closing the opening 32 in the transmission housing is removed. The beveled gear 33 and shaft 36 are then inserted through the opening 32 and the housing 37 is secured to the transmission housing 5. The block 7 is then placed in engagement with the adjacent sides of the engine casing and transmission housing so that the beveled gear 39 is placed in mesh with the beveled gear 38. The arm 3 and brackets 11 may then be secured respectively to the rear axle housing 2 and to the flanges 12 of the engine casing. The brace rods 13 may also be secured to the radius rod couplings 14.

After the mower is attached and the lever 26 has been released to permit the shoe 20 to engage the ground, the desired distance between the ground and the cutter bar may be obtained by adjusting the turn-buckle connection 25. The cutter bar may be operated by shifting the clutch lever 43 to place the gear 38 in mesh with the gear 39 upon the shaft 40.

In the modification illustrated in Figure 4, the block 7 is provided with a recess 60 which receives a universal joint 61 for a pair of shafts 62 and 63 respectively journaled in the block. A bevel gear 64 is rigidly secured to the shaft 62 at the outer end thereof and is adapted to mesh with the bevel gear 38 while a disk or eccentric 65, similar to the disk 51, is secured to the shaft 63 at the outer end thereof and is adapted to actuate the connecting rod 53.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with a motor driven tractor, of an attachment therefor including a member detachably secured to said tractor, a cutter bar, a ground engaging shoe supporting said cutter bar, means slidably mounted upon said member for supporting said shoe, actuating mechanism for said cutter-bar, and a drive connection between said actuating mechanism and the motor of said tractor, said slidably mounted shoe supporting means being separate and distinct from said actuating and driving mechanism and operable independently thereof.

2. The combination with a motor driven tractor, of an attachment therefor including a block carried by the tractor, a cutter bar, a ground engaging shoe supporting said cutter bar, means slidably mounted upon said block for supporting said shoe, means for raising and lowering said shoe support, actuating mechanism for said cutter bar, and a drive connection between said actuating mechanism and the motor of said tractor, said slidably mounted shoe supporting means being separate and distinct from said actuating and driving mechanism and operable independently thereof.

3. The combination with a motor driven tractor, of an attachment therefor including a block carried by the tractor, a cutter bar, a ground engaging shoe supporting said cutter bar, a member slidably mounted upon said block for supporting said shoe, an adjustable connection between said slidable member and said shoe for varying the distance between the ground and said cutter bar, actuating mechanism for said cutter bar, and a drive connection between said actuating mechanism and the motor of said tractor.

4. A mowing attachment for tractors comprising a support, means for mounting said support detachably upon a tractor, a bar slidable substantially vertically in said support, an arm depending from said bar and forming an integral portion thereof, cutter mechanism carried by said arm at its lower extremity, actuating means for said mechanism carried by said support and means for vertically adjusting said bar and arm including an operating handle secured to said bar and arm at the point of connection thereof.

5. A mowing attachment for tractors comprising a support, means for detachably mounting said support upon a tractor, a bar slidable substantially vertically in said support, means for adjusting said bar vertically, an arm depending from the upper extremity of said bar, and cutter mechanism carried by said arm at its lower extremity.

6. A mowing attachment for tractors, comprising a shoe, a cutter bar supported upon said shoe, a member to which said shoe is pivotally secured, and a brace rod extending from said shoe to said member adjustable in length.

7. A mowing attachment for tractors comprising a support located upon one side of the tractor, cutting mechanism carried by the support, and means for detachably connecting said support to the tractor including a bar extending rearwardly from said support and having a portion thereof extending across the transmission housing of the tractor, said bar being secured to the rear axle housing of the tractor upon the side thereof opposite to that upon which the said support is mounted.

8. A mowing attachment for tractors comprising a support, cutting mechanism carried by said support, and means for detachably connecting said support to the tractor including a rearwardly extending bar having its forward end secured to said support on one side of the tractor and its rear end secured to the rear axle housing of the tractor on the opposite side thereof, said bar being provided with an intermediate transverse portion extending over the transmission housing of the tractor.

9. A mowing attachment for tractors comprising a support, means for detachably mounting said support upon a tractor, cutting mechanism for said tractor, a shoe for supporting said cutting mechanism, and means for vertically adjusting said cutting mechanism including a substantially inverted U-shaped bar having one leg thereof slidable within said support and the other leg positioned outside of said support and connected to said shoe.

10. A mowing attachment for tractors comprising a support provided with a vertical groove, pinions mounted within said groove, means for detachably mounting said support upon a tractor, cutting mechanism for said tractor, a shoe for supporting said cutting mechanism, and means for vertically adjusting said cutting mechanism including a substantially inverted U-shaped bar having one leg thereof slidable within said groove and provided with rack teeth for engaging the pinions mounted therein, the other leg of said bar extending outside of said support and being connected to said shoe, and an operating handle for said bar mounted upon said support.

In testimony whereof I affix my signature.

HENRY SMITH.